(12) United States Patent
Chesner et al.

(10) Patent No.: US 6,432,303 B1
(45) Date of Patent: Aug. 13, 2002

(54) CONTAMINATED SEDIMENT EXCAVATOR FOR SUBSURFACE SEDIMENT REMOVAL

(76) Inventors: Warren Howard Chesner, 3277 Benjamin Rd., Oceanside, NY (US) 11572; James Melrose, 600 Robinson Rd., Greenport, NY (US) 11944

( * ) Notice: Subject to any disclaimer, the term of this patent is extended or adjusted under 35 U.S.C. 154(b) by 0 days.

(21) Appl. No.: 09/812,996

(22) Filed: Mar. 20, 2001

Related U.S. Application Data

(60) Provisional application No. 60/190,809, filed on Mar. 21, 2000, and provisional application No. 60/197,551, filed on Apr. 17, 2000.

(51) Int. Cl.$^7$ .................................................. E02F 3/28
(52) U.S. Cl. ................ 210/170; 210/202; 210/203; 210/257.2; 210/242.1; 37/341; 37/345; 37/318; 405/10
(58) Field of Search ...................... 210/170, 242.1, 210/202, 203, 205, 241, 257.2, 258, 259, 321.69; 37/318, 320, 341, 345; 405/8, 10, 12

(56) References Cited

U.S. PATENT DOCUMENTS

| | | | | | |
|---|---|---|---|---|---|
| 692,557 | A | * | 2/1902 | Swenson | 405/10 |
| 852,713 | A | * | 5/1907 | Gardner | 405/10 |
| 1,047,233 | A | * | 12/1912 | Jackson | 37/318 |
| 5,173,182 | A | * | 12/1992 | Debellinn | 210/170 |
| 5,561,922 | A | * | 10/1996 | Lynch | 37/341 |
| 6,038,795 | A | * | 3/2000 | Navorro | 37/341 |

* cited by examiner

*Primary Examiner*—Christopher Upton
(74) *Attorney, Agent, or Firm*—Alfred M. Walker

(57) ABSTRACT

A system and method removes contaminated sediments during dredging operations to minimize the dispersion of particulate matter that normally occurs during conventional mechanical or hydraulic dredging operations. The system uses a specially designed pressure controlled enclosure or enclosed excavator that houses a mechanical bucket. The enclosure is designed to capture suspended particles that are dispersed into the water column during the mechanical dredging process. The system also includes the use of a self-contained membrane filtration treatment vessel to remove fine particulate matter from dredge drainage waters collected in the process.

36 Claims, 3 Drawing Sheets

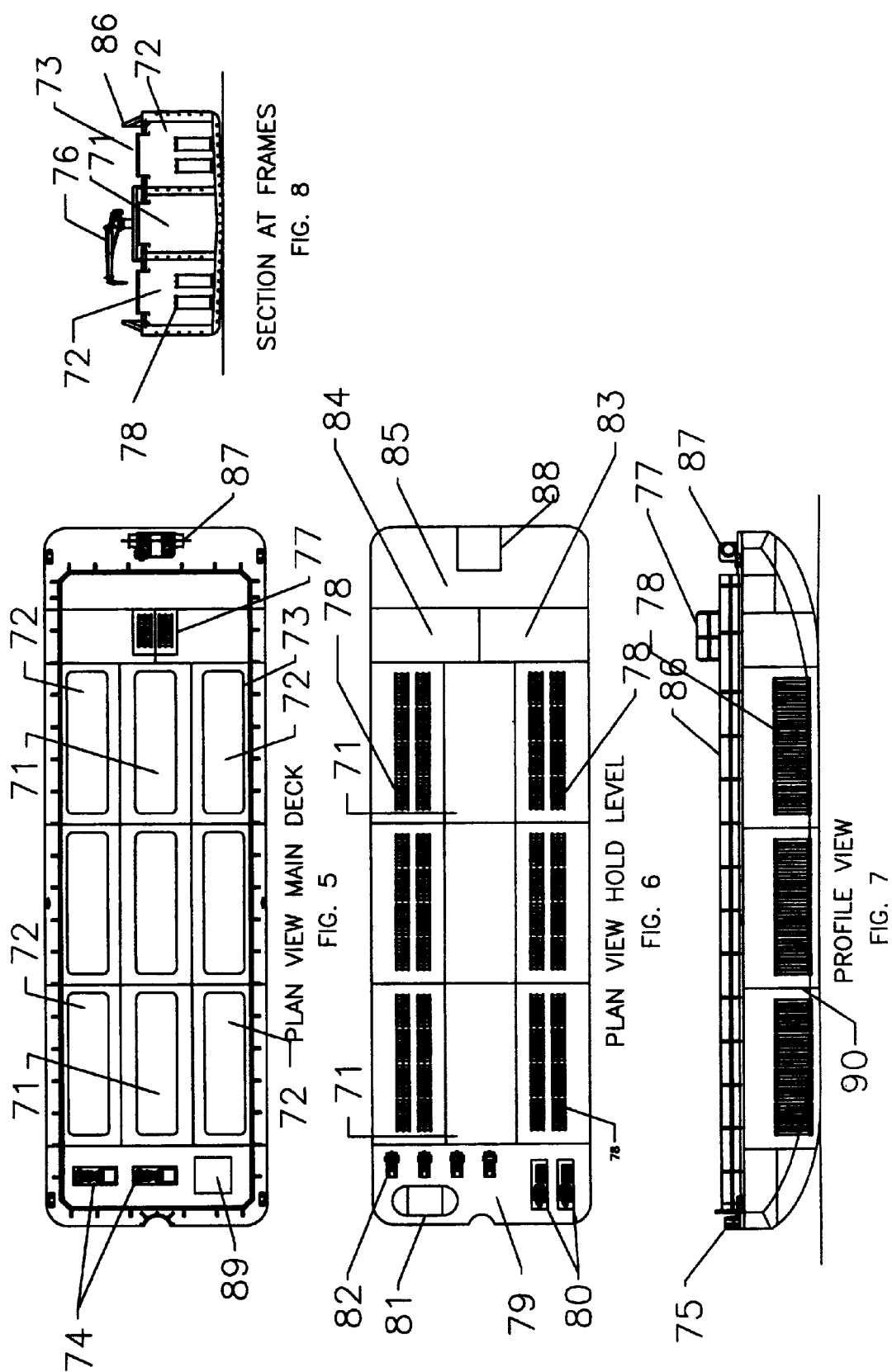

CONTAMINATED SEDIMENT EXCAVATOR FOR SUBSURFACE SEDIMENT REMOVAL

RELATED APPLICATIONS

This application is based upon provisional application No. 60/190,809, filed Mar. 21, 2000, entitled "Sealed Sediment Extractor for Contaminated Sediment Clean-up.", and provisional application 60/197,551, filed Apr. 17, 2000.

TECHNICAL FIELD OF THE INVENTION

This application relates to a process for removing contaminated sediments from the bottom of lakes, reservoirs, rivers, streams, and other water bodies, while at the same time minimizing the release of particulate to the ambient environment during the excavation process, and cleaning the waters extracted during this process.

BACKGROUND OF THE INVENTION

Dredging to extract and remove bottom sediments involves mechanically raking, grabbing, penetrating, cutting, or hydraulically scouring the bottom of the waterway to dislodge sediment. This is a special problem when the dredge site contains highly contaminated materials that must be removed without dispersing the sediments and contaminating alternate locations. Bottom sediments disturbed by dredging operations, but not removed from the water body, pose several environmental problems. If the sediments are contaminated, the resuspension of particles provides the means for contaminants to migrate from their original source to new locations, impacting marine life in these areas and ultimately the ecosystem and food chain.

Of particular concern is the resuspension of fine clay and organic sediment particles (micron- and submicron-sized). Such particles tend to concentrate contaminants due to their high absorptive properties and the large surface areas that are cumulatively available in this very small size range. In addition to sediment toxicity problems, excessive particulate resuspension in environmentally sensitive areas results in visible turbidity, which may inhibit fish migration or reproductive patterns, impair fish gills, or cover larvae, eggs or bottom-feeding invertebrates. United States Environmental Protection Agency, Assessment and Remediation of Contaminated Sediments (ARCS) Program, Remediation Guidance Document, USEPA 905-B94-003, October 1994.

Current methods of dredging can be divided into two general categories. They include mechanical dredging and hydraulic dredging. The fundamental difference between these categories is in the form in which the sediments are removed. Mechanical dredges remove the sediments directly with clamshell-type buckets. The operation consists of lowering the bucket with a crane to the bottom of the waterway, scooping or extracting the sediment, and bringing the sediment to the surface for disposal (typically in a dredge barge). Hydraulic dredges, sometimes referred to as vacuum dredges, are designed to vacuum up bottom sediments. Unless the sediments are very loose, vacuum dredges require cutter heads or alternative means to dislodge the dredge material so that the sediment can be vacuumed into the dredge head.

Mechanical dredging operations typically yield much lower liquid to solid ratios (30 to 70 percent by weight) compared to hydraulic dredges (less than 1 to 10 percent by weight). Mechanical dredges, however, have the potential to resuspend sediment and contaminate the ambient water as the bucket initially contacts and penetrates the sediment. This action scoops and rakes the sediment, extruding bottom sediments perpendicular to the cut) away from the bucket. It introduces contaminated sediments into the inside of the bucket, which contacts and displaces water inside the bucket, forcing this (now contaminated) water back into the water column. When the bucket is lifted it produces an upswell that releases additional sediment particles into the water column. In addition, buckets that are not adequately sealed or unable to close completely, during the excavation process, will drain contaminated sediment particles back into the water column during the entire lifting cycle.

While hydraulic dredges provide a vacuum to draw in particulate matter during the dredging operation, cutter blade sediment agitation and raking is a major source of particulate resuspension, and vacuum recovery of these resuspended particles in conventional hydraulic dredge systems, particularly if there is any current in the waterway, is typically not very high. In addition, because hydraulic or vacuum type dredges remove and transport sediment in a slurry form, large quantities of water are collected with the sediment and must be contained and treated. This is typically accomplished by discharging the solids and water into an impoundment area to permit solids removal (typically by settling). The liquid portion of the slurry is normally discharged back into the ambient water environment after the settling process. The use of large impoundment areas for the dredging of contaminated sediments introduces the risk of on-shore or groundwater contamination and would, in general, be considered a questionable practice with highly contaminated sediments. Finally, a high degree of treatment of this impounded water is necessary to ensure that the excess water can be safely discharged back into the ambient water environment.

Some conventional mechanical dredges have been redesigned in an attempt to minimize sediment resuspension (Ouwerkerk, R. and H. Greve (1994). "Developments in Dredges During the Last Decade." Pages 690–699 in Dredging '94, Proceedings of the Second International Conference on Dredging and Dredged Material Placement, Edited by: E. C. McNair, Jr., American Society of Civil Engineers. 1994. Zappi, P. A. and D. F. Hayes. "Innovative Technologies for Dredging Contaminated Sediments." Improvement of Operations and Maintenance Techniques Research Program, U.S. Army Corps of Engineers, Waterways Experiment Station, Vicksburg, Miss. Miscellaneous Paper EL-91-20. September 1991. Herbich, J. B. Handbook of Dredging Engineering, McGraw Hill, Inc., N.Y. 1992.). The primary objective of most mechanical dredge equipment modifications is to create as tight a seal as possible on the bucket through the installation of rubber backing compressible seals and sensors (proximity switches) to ensure the bucket is closed prior to lifting in the hope of minimizng spillage. While these types of systems offer improved designs, they do not eliminate the impact due to raking, upswell, and water displacement that will occur on excavation.

Numerous modifications and subcategories of hydraulic dredges have been developed to mitigate problems associated with hydraulic dredging particle resuspension. Pneumatic dredges, a subcategory of hydraulic dredges, use alternating cycles of negative and positive air pressure in a submerged chamber to draw sediment through a pipe into the chamber and to propel the sediment to the surface. Hydraulic or pneumatic dredges characterized as airlift dredges, amphibex dredges, bucket wheel dredges, clean up dredges, cutterhead dredges, delta dredges, dustpan dredges, eddy pump dredges, horizontal auger dredges, plain suction dredges, pneuma pumps, and oozer dredges are dredges that make use of hydraulic pumps and/or air compressors to draw in sediment (Cleland, J., Advances in Dredging Contaminated Sediment, Scenic Hudson, Inc., 1997). Many have specific features that attempt to reduce sediment dispersion that results from cutterblade, jetting, or raking mechanisms. None of these methods, however, significantly reduce or have suitable provisions for managing large volumes of contaminated water that are generated in the process. Large impoundment areas and suitable treatment methods are still needed to contain fine contaminant particulates that are drawn up with these sediments.

Several recent patents have proposed methods that make use of compressed air and/or hydraulic pumping operations to collect contaminated sediments in a manner that minimizes sediment dispersion.

Lynch in his U.S. patent, Contaminated Marine Sediments Dredging Apparatus, U.S. Pat. No. 5,540,005, Jul. 30, 1996, proposes the use of a dredging device that is comprised of scoop buckets, retractable rigid silt curtains, and the means to introduce pressurized air into the dredging device. Lynch's device is intended to collect dredge matter in a manner that minimizes the extrusion of soil out the sides of the apparatus during the excavation process (the purpose of the rigid silt curtains) and minimizes the extraction of water from the interior of the apparatus (water displacement) when contaminated dredge material is scooped in by maintaining a pressurized dredging device that reduces water intrusion and hence displacement. In a subsequent patent Lynch, Extrusion Dredging Apparatus, U.S. Pat. No. 5,561,922, Oct. 8, 1996, proposes the use of a scoop bucket, similar to his earlier patent, but with mechanical modifications that includes powered helices to propel soil upward to the surface. No method for handling the liquid and sediment extracted is defined. Lynch's device makes no attempt to collect any dispersed particulate matter outside the limits of the boundary of the scoop.

Sturdivant describes an invention, Hybrid Dredge, U.S. Pat. No. 5,311,682, May 17, 1994, that is characterized as a hybrid dredge that utilizes features of both a mechanical dredge and a hydraulic dredge in an attempt to reduce resuspension problems associated with mechanical dredging operations and large water volumes associated with hydraulic dredging operations. These objectives are similar to the subject invention, however the approach differs significantly. Sturdivant proposes to achieve these objectives through an invention that he claims can remove dredge material at low velocities without generating large volumes of water. The proposed equipment consists of a clamshell bucket attached to a rigid extension boom situated on a floating platform fixed at a position by use of adjustable spuds. The clamshell deposits the material into the hopper of a positive displacement pump that transports the sediment collected in the bucket to the disposal area, similar to a hydraulic dredge, but at a lower water to solids ratio. Sturdivant claims the particle suspension can be reduced by use of a boom that extends and contracts into the sediment instead of using a bucket controlled by a crane that is dropped into the sediment, resulting in particle resuspension problems. No method is provided to collect any dispersed particles.

It is the nature of subsurface dredging that all current dredging methods will disperse fine and sometimes coarse, particulate matter into the water column. It is apparent from the above that to effectively collect contaminated particles, suspended during the dredging process, it is necessary to collect both the particles and a given quantity of water associated with the water column or control zone into which these particles are suspended. It is also apparent that to effectively manage the water and suspended particles without the need for constructing large onshore impoundments or treatment facilities, it is necessary to control the volume of water in said water column in order to minimize said quantity. Finally, it is apparent that to treat such waters will require a system with a high degree of efficiency and which will be sufficiently mobile so that the treatment process can move with the dredging operation up and down a given waterway.

In contrast to the prior art, the invention being disclosed herein also relates to the development of individual processes that permit the extraction of contaminated sediments or dredge materials from the bottom of natural or artificial (man-made) water bodies, including but not limited to streams, lakes, reservoirs, rivers, estuaries, canals, and harbors in a manner that provides for effective cleanup, minimizes the resuspension and migration of particles of sediment collected during the process.

OBJECTS OF THE INVENTION

It is therefore an object of the invention to extract sediments from the bottom of lakes, rivers, reservoirs, and other water bodies in a manner that minimizes the dispersion of transport of particles during the dredging process.

It is also an object of the invention to utilize a mechanical dredge or bucket-type of dredge that yields a relatively low liquid to solid ratio as the means to collect the bottom sediments.

It is a further object of the invention to utilize a mechanical pressure-controlled enclosure to house the mechanical dredge to capture and contain particles dispersed during the dredging process.

It is a yet another object of the invention to treat water collected in the process with a polymeric micro or ultrafiltration membrane treatment system to enable the discharge of this treated water back into the ambient environment.

It is also a further object of the invention that such a treatment system be incorporated into a self-contained dredge water treatment vessel.

It is still a further object for the self-contained water treatment vessel to contain the necessary equipment to collect and store excess dredge water, provide pretreatment to remove high solids loadings, if necessary, pass the liquid stream through the membrane filter, recirculate and treat the retentate stream, and collect and stabilize solids collected in this process for land disposal.

It is yet a further object of the invention to provide post-treatment for removal of soluble components in the permeate stream, if necessary.

It is also another object of this invention to collect dredge water during dredging operations by direct discharge into the dredge water treatment vessel or by discharge into an intermediate storage barge available to store the dredge water until such time as treatment may be effected.

It is a further object of the invention to use polymeric membranes capable of micro and ultrafiltration as a treatment method.

It is a further object of the invention to use either positively pressurized or vacuum driven hollow fiber membrane treatment systems to treat the contaminated water.

It is a further object of the invention to provide such treatment system on-board a self-contained treatment vessel.

It is also an object for this self contained water treatment vessel to contain the necessary equipment and treatment operation to pump the contaminated water, recirculate and treat the retentate stream, collect, stabilize, and treat solids and organisms removed from the contaminated water, and clean and maintain the filters used in the process.

It is yet another object of the invention to discharge treated water directly back into the ambient water environment.

It is a further object of the invention to convert the collected solids generated in the treatment process system to a stabilized form prior to disposal.

It is also an object of the present invention to improve over the disadvantages of the prior art.

SUMMARY OF THE INVENTION

In keeping with these and other objects of the invention, which will become apparent, a system is described for collecting sediments, particularly those that contain contaminants that may be harmfull to the aquatic environment if released and dispersed during the dredging process. Subsequent treatment is provided in a self-contained dredge water treatment vessel using membrane filtration to filter and remove such particles prior to release of the treated water back into the ambient environment.

The subject invention provides a new method to collect sediments with low liquid to solids ratios using an excavator, such as, mechanical bucket, with a dispersed particulate containment system and a dispersed particulate treatment system, capable of both containing and removing collecting sediment particles disturbed and suspended into the water column during the excavation process.

In this excavator embodiment, the system provides for the containment of particles by use of a specially designed enclosure that envelops and isolates a mechanical dredge (such as a hinged clamshell bucket) and introduces an alternating cycle of positive and negative pressure within the enclosure to control water intake and collect sediment particles that are dispersed during the dredging process. Dispersed sediment particles collected in this process are diverted to a water treatment system, specially designed to remove suspended solids captured within the enclosure, so that the collected water can be safely discharged to the ambient environment.

Operation of this excavator embodiment of the sediment collection system involves the lowering of the enclosed excavator from a vessel or from the shore (if it is convenient to do so) to the location in the water body where sediment extraction is desired, and retrieving the sediment and any dispersed particles generated during the process. The collected sediment is discharged to a dredge barge or other suitable receptacle and the dispersed particles are transported to the water treatment system for removal. Operation of the excavator enclosure involves two cycles: 1) a submersion cycle in which the enclosure is positively pressurized to prevent liquid from entering the enclosure, and 2) a recovery cycle in which the enclosure is negatively pressurized and water is drawn into and pumped from the enclosure to collect particles suspended during the excavation process.

While water collected in the enclosure may be pumped to any suitable treatment system for the removal of particulate matter and soluble contaminants if necessary, the inventors have included in this invention a preferred embodiment for a micro- or ultrafiltration membrane treatment system for micron and submicron sized particulate removal. Such a system has not been used for the treatment of effluents from dredging operations and the capacity of such system to remove extremely fine (submicron-sized) particles makes it well suited for such a process application. The treatment system of this micro- or ultrafiltration membrane treatment embodiment includes two primary stages for treatment of the particle-laden water prior to disposal. The first stage includes a flow equalization stage. This stage, which is intended to equalize the flow to the second or membrane filtration stage of the process, is also available for pretreatment, if necessary, for preliminary solids removal and oily water separation. The second stage includes the membrane system. This stage is designed to remove very fine micron and submicron-sized particles remaining in the water. If needed, post-treatment could be included to remove residual soluble contaminants in the effluent stream using processes such as activated carbon adsorption or chemical oxidation processes.

Commercially available membrane filters act as barriers, that can be used to separate particulate and dissolved components in both liquid and gaseous streams. The particular focus of the treatment proposed in this invention is separation of particles in the microfiltration (~0.1 to 100 microns) and the ultrafiltration (~0.01 to 0.1 micron) range.

There are presently two major types of commercially available microfiltration and ultrafiltration systems. These are polymeric and ceramic systems. These two systems are typically categorized, with respect to the supporting membrane module or configuration, as hollow fiber polymerics, tubular polymerics, spiral wound polymerics, plate polymerics, tubular ceramics, dense-pack ceramics. Other membrane configurations or modifications of existing configurations, such as flat membrane systems, rotary cylinders, and rotating disc modules are also in use and new configurations are in continual development. The inventors, having tested both ceramic and polymeric systems, have found polymeric systems to be the preferred system from a cost and effectiveness viewpoint for the subject application.

Most microfiltration and ultrafiltration systems in operation at the present time utilize positive pressure as a driving force to pass liquids through the membrane. Pressurized systems can be operated in a dead-end mode, in a cross-flow mode or in a dynamic filtration mode. In a dead-end mode, all of the incoming raw water, with the exception of a relatively small retentate or blowdown stream, is passed through the membrane. In a cross-flow mode the feed is pumped tangentially to the membrane surface. In such an operation, one stream enters a membrane module (the feed stream) and two streams exit (a relatively large recirculation stream and the permeate stream). The cross-flow stream induces a shearing and hence cleaning action on the membrane, which leads to reduced particulate fouling or caking and a higher average flux rate than a dead end operation. Dead-end pressurized systems typically operate under lower transmembrane pressures than cross-flow systems. A dead-end or cross-flow pressurized membrane system is suitable for use in the subject invention. In a dynamic microfiltration operation, the filter medium is moved (typically rotated) at sufficient speed relative to the fluid stream to produce sufficient shear forces to maintain a free filter surface for extended periods of time. A dynamic microfiltration membrane system is suitable for use in the subject invention.

In recent years, immersed or submerged vacuum-driven hollow fiber membranes have been introduced commercially. An immersed hollow fiber membrane filter operating under negative pressure is a polymeric filter that achieves filtration by drawing water through a thin fiber (membrane) surface into the hollow annular inner core of the fiber. Permeated water is transported through the inner core to a common header pipe where it is discharged. To improve flux rates and reduce fouling, compressed air is typically introduced at the bottom of a fiber module to agitate the fibers and induce tangential shear forces adjacent to the membrane, thereby preventing solids buildup on the individual fibers. An immersed hollow fiber membrane system is suitable for use in the subject invention.

In both positively pressurized and vacuum driven membrane systems a gradual solids buildup will occur in the recirculation or retentate stream. Periodic blowdown or treatment of pressurized system retentate or immersed filter reactor streams is necessary as part of the operational process to limit the influent solids concentrations to the filters. In both systems backpulsing and interim cleaning of filters will be necessary. Chemical treatments are available (oxidizing agents, alkalis and acids) to periodically backpulse and clean the membranes to restore their flux rates should fouling occur.

To implement a membrane filtration strategy for the referenced applications, the membrane filtration embodiment of the subject invention provides for the use of a "self-contained water treatment vessel," designed with water storage and equalization capacity, solids treatment and handling, and soluble organic treatment, if needed.

In dredge water treatment operations, the treatment vessel is located directly adjacent to the dredging operation to permit the discharge of excess water into the treatment vessel or into a storage barge of sufficient capacity to store excess dredge waters, if needed, prior to discharge of the water to the treatment vessel. While one focus of such a treatment vessel is to treat dredge waters generated during excavation operations with the aforementioned excavator, such a treatment vessel can also be used to collect and treat waters from hydraulic dredging operations. In hydraulic dredging operations, where the sediment is extracted by vacuum generating large quantities of water, a settling barge or vessel to remove the sediment, would in most cases, be required with overflow from the barge directed to either a storage vessel or the membrane treatment vessel.

DESCRIPTION OF THE DRAWINGS

The present invention can best be understood in conjunction with the accompanying drawings, in which:

FIGS. 5, 6, 7 and 8 depict design concepts of the main deck, hold level, profile and section of an immersed self-contained water treatment vessel for collected dredge water treatment;

DESCRIPTION OF THE PREFERRED EMBODIMENT

The present invention includes a process for collecting subsurface sediments using a method that minimizes the dispersion of particles contained within such sediments, and also includes the use of a pressure-controlled enclosure along with a self-contained water treatment vessel to treat the waters collected during this process.

Figure 1:
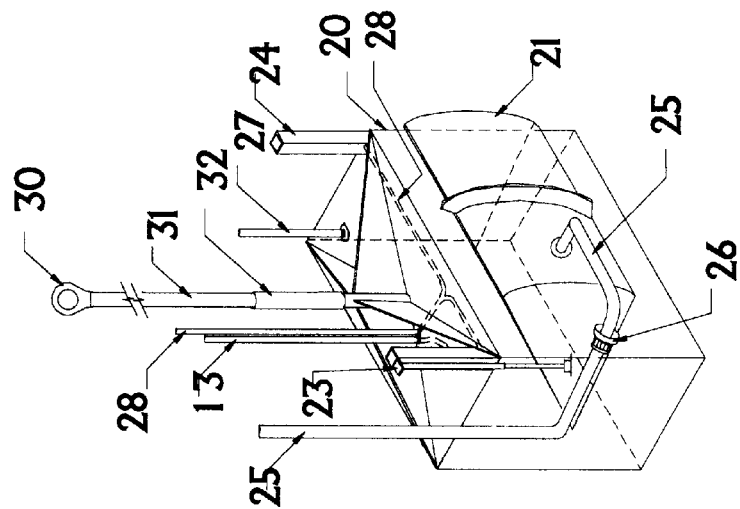
FIG. 1 is a schematic of the enclosed excavator, which consists of a mechanical dredge or bucket situated within a pressure-controlled enclosure.
Figure 2:
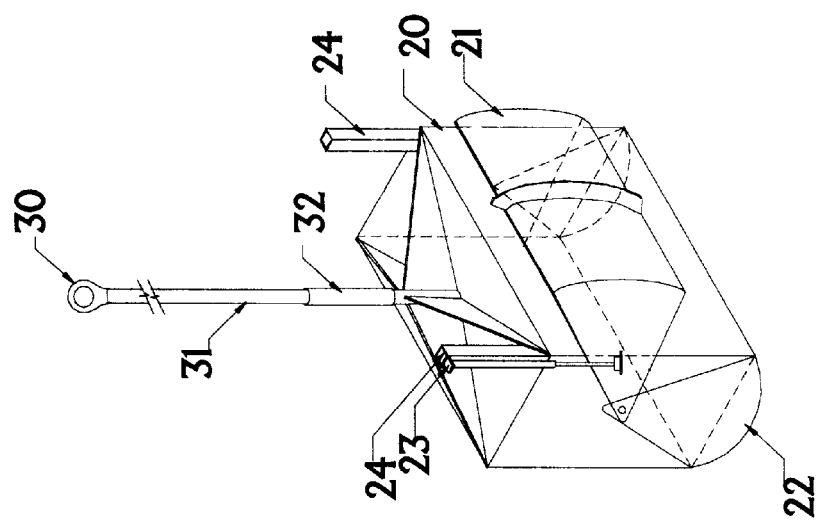
FIG. 2 is a schematic of the enclosure's unique single-hinged door shown in a fully opened and fully closed position.

As shown in FIG. 1, in a sealed sediment excavation process embodiment, the process is affected by a clamshell-type bucket 10 housed within a pressure-controlled enclosure 20. Both the enclosure and dredge bucket contained within the enclosure can be lowered with a lifting shackle 30, and connected to a dredge bucket shaft 31 by means of a clevis and pin 33. The dredge bucket shaft 31 guided into the top of the enclosure by a stuffing box 32 to prevent leakage into the shaft or loss of pressure inside the enclosure. The dredge bucket is opened and closed by means of a hydraulic piston 34. As shown in FIG. 2, in this sealed sediment excavator embodiment, the pressure-controlled enclosure 20 is outfitted with a rotating single-hinged door depicted in FIG. 2 in both the fully opened 21 and fully closed positions 22. This door would typically be in the open position during the submersion cycle of the operation, and in the closed position following the excavation process or recovery cycle. The door would be closed as soon as the enclosure 20 is clear of the bottom. It remains closed as the enclosure is lifted from the bottom and reopened prior to the sediment load being discharged to a top surface dredge barge or other container designed to collect and dispose of the dredged material.

The single-hinged door can be opened and closed with a door control piston 23, which is attached to piston support columns 24.

Figure 3:
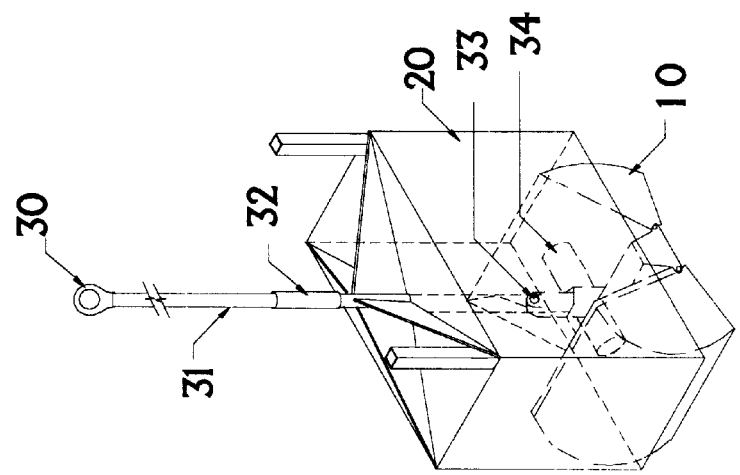
FIG. 3 is a schematic showing the pneumatic, pumping, hydraulic, and mechanical controls associated with the enclosure.

As shown in FIG. 3, depicting the sealed sediment extractor embodiment, the rotating single-hinged door 21 is outfitted with a water pump line 25 and a submersible pump 26 or surface supplied pump (not shown) that can evacuate the water that is drawn into the pressure-controlled enclosure 20 during the recovery cycle of the operation. A pneumatic pressure line 27 is incorporated into the design to control the air pressure within the enclosure. Access is provided for the hydraulic bucket control lines 13, which are used to open and close the dredge bucket and the hydraulic door control lines 28, which are used to drive the door control pistons. The hydraulic lines used to drive the pump and the hydraulic lines for the dredge bucket are not shown on the drawings, but are also be included as part of the system.

To treat the water pumped from the enclosure, the inventors have supplemented the dredging process with a membrane water treatment system.

Figure 4:
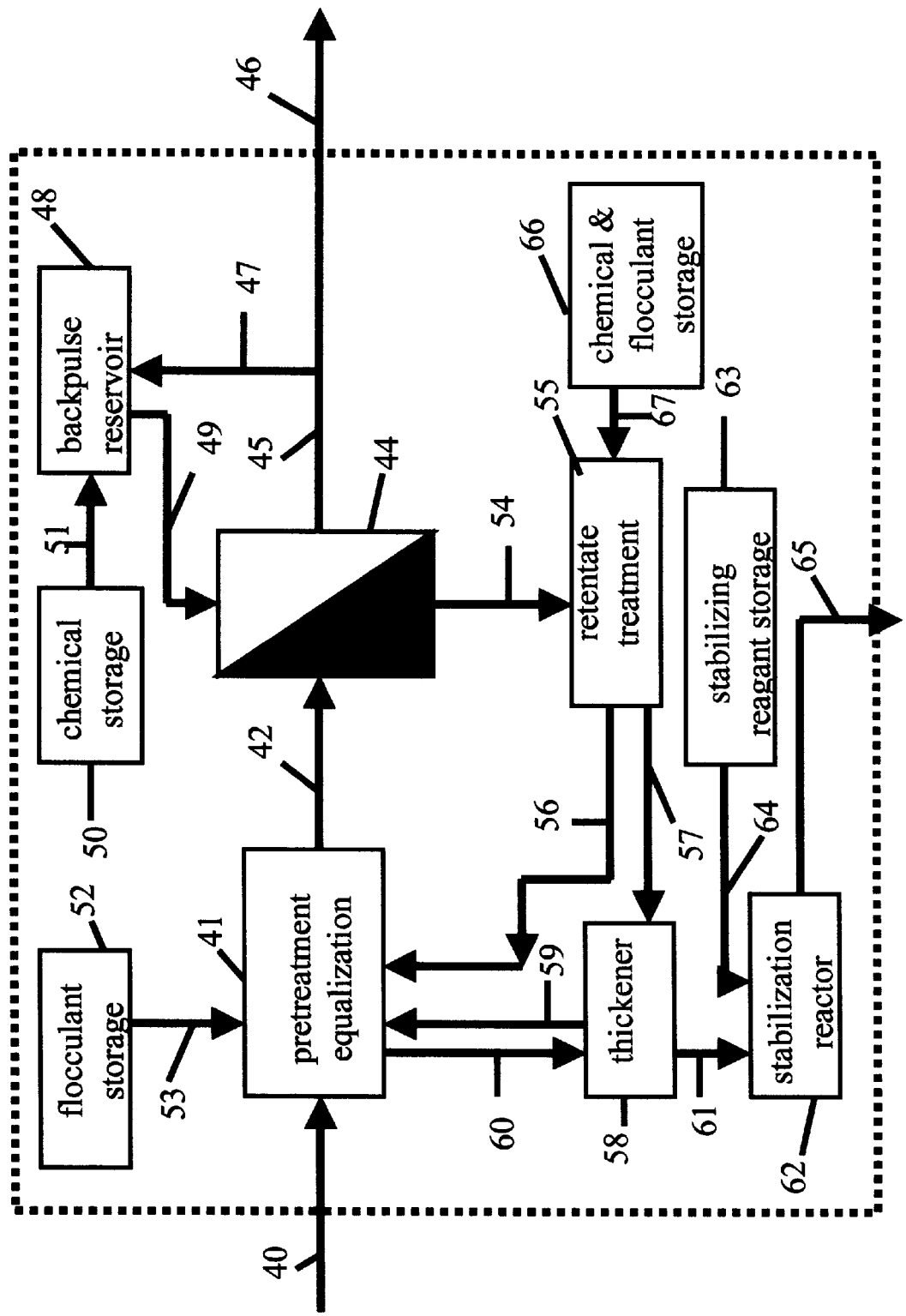
FIG. 4 is a process flow diagram depicting the flow process on-board the self-contained membrane filtration treatment vessel.

For example, in this membrane water treatment system embodiment shown in FIG. 4, the process involves the collection of dredge water and the transport of such water, by either gravity or pumped flow 40, to a self-contained water treatment vessel described subsequently and shown in FIGS. 5 through 8.

Within such vessel, the dredge water is discharged to a pretreatment/equalization tank area 41. The available volumetric capacity in this area can be used to equilibrate the flow to the membrane filters 44. If the offending water is found to contain suspended solids exhibiting sufficient specific gravity to settle quickly, then such solids will be removed at this pretreatment location 41. Such location will, if necessary, be supported with chemical coagulants and/or flocculants stored 52 on board the vessel, if needed, that can be introduced 53 to the pretreatment tank 41 to enhance particulate removal should additional solids removal be required.

From the pretreatment/equalization tank area 41, the dredge water is pumped or gravity fed 42 to the membrane filters 44. Either a positively pressurized or vacuum membrane filtration system is suitable for the subject invention.

Those who are versed in the art of membrane filtration design will recognize that complete rejection of all micron and submicron particles (for example, greater than 0.1 micron) can readily be attained. The membrane surface area required will be dependent on the design flux rate of the membranes and the volumetric flow rate of the retentate or blowdown stream.

In a membrane system, as clean permeate is collected, the remaining retentate or recirculation stream will concentrate the non-permeating solids. To control solids buildup, a retentate or portion of the recirculation stream must be extracted (blowdown). Controlling the volumetric flow rate of the retentate or blowdown stream 54 can control the solids buildup. Solids buildup must be controlled to prevent concentration polarization or fouling of the membrane. For example, in a system with 100 percent particulate rejection, which can readily be achieved using the subject filtration process, the retentate or blowdown stream flow rate can be calculated using the mass balance equation $V_{54} \cdot C_{54} = V_{42} \cdot C_{42}$, where $V_{54}$ is the retentate or blowdown stream 54 volumetric flowrate, $C_{54}$ is the particulate or suspended solids concentration of the retentate or blowdown stream 54, $V_{42}$ is the volumetric flowrate of the pretreatment system effluent stream 42, and $C_{42}$ is the particulate or suspended solids concentration of the pretreatment system effluent stream 42. Pilot studies undertaken by the inventors suggest that ratio $V_{54}/V_{42}$ ratio of less than 0.25 will adequately control solids in such water treatment systems.

Permeate from the membrane filtration system for most dredge waters will treated to such an extent that discharge of such waters directly to the ambient environment 46 will be possible. For waters requiring additional treatment such as activated carbon contact, ozonation or ultraviolet radiation, such systems can readily be incorporated, as tertiary treatment, into the process. If backpulsing or backwashing is used in the process, some permeate can be diverted to 47 and stored in a backpulse reservoir 48 for use in the backpulsing operation 49. Backpulsing operations involve periodic membrane backflushing. The addition of chemical oxidants (e.g., sodium hypochlorite), acids (e.g., citric acid), or alkalis (e.g., sodium carbonate) to the backpulse water will typically help control biological and/or mineral fouling of the membrane. The type of chemical additive used will be dependent on the nature of the fouling, and can be stored onboard the vessel, if needed 50.

Retentate or blowdown water 54 can be directed to a separate retentate treatment system 55 or returned directly 56 to the pretreatment system 41 for solids removal. Separate retentate or blowdown treatment 55 can be expected to include chemical treatment (flocculation) and settling and would require chemical and flocculant storage facilities 66. In a dredge water treatment system subjected to contaminated sediment clean-up activities, solids collected during this treatment 55 can be expected to contain concentrated contaminants. To assist in managing these solids, the solids can be pumped 57 to a solids thickener 58 for additional thickening and liquid decanting 59. Thickener decant 59 can be returned to the pretreatment/equalization tank 41. Solids collected from the pretreatment/equalization tank 41 can also be directed 60 to this thickener 58.

Thickened solids can be pumped 61 to a stabilization reactor 62 where chemical fixation or stabilization of the thickened solids will be effected. The addition of appropriate stabilization reagents, stored on board the vessel 63, can be fed 64 to the stabilization reactor 62 to dewater, and solidify the solids fraction. This will ultimately provide for easier on-shore handling, transportation, and disposal of the solids collected in the process. Stabilized solids can subsequently be removed for on-shore disposal 65. Appropriate stabilizing reagents can include, but are not limited to, lime, lime kiln dust, Portland cement, cement kiln dust or other additives capable of increasing the pH of the solids, reacting with available water (hydration reactions) and producing cementitious or pozzolanic activity.

FIGS. 5, 6, 7, and 8 are intended to show design views through a self-contained treatment vessel containing an immersed membrane treatment system. The design layout shown can be readily modified to accommodate the installation of pressurized membrane systems. Its presentation is in no way intended to limit the scope of the application to immersed membrane systems only and is intended to illustrate additional detail associated with the self-contained treatment vessel concept.

The treatment vessel shown in FIGS. 5, 6, 7, and 8 is a barge-like vessel where pretreatment/equalization tanks 71 are shown, in FIG. 5 on the main deck plan, running down the center of the vessel. These pretreatment/equalization tanks, as described above, are available for solids removal and to provide flow equalization capacity. Membrane filters are located in membrane reactor tanks 72 (six shown for illustration only), three located on the starboard and three located on the port sides of the vessel. Hatch covers 73 placed over each of the open tanks are shown. Hatch cover removal during system maintenance can be achieved with the use of a moving crane, transported on rails down the centerline of the vessel. Such a crane and rail system 76 is shown in FIG. 8.

Diesel generators 74 are shown mounted aft of the treatment tanks along with a fuel tank 89. For immersed membrane systems, periodic cleaning of the membrane will be required and can be accomplished on-board in soaking tanks 77, shown on the main deck in FIG. 5.

Two rows of immersed membrane cartridges 78 (preferably four cartridges per row) in each reactor tank as shown in FIG. 6, on the hold level, provide the necessary surface area for the design requirements of the vessel shown.

FIG. 6 also depicts the pump room 79, which houses the compressors 80, receiver 81, and permeate pumps 82. The solids thickener 83, and solids stabilization area 84 are also shown. Space for chemical storage (flocculants, membrane cleaners, and stabilizing agents) is shown in the chemical storage location of the vessel 85. The chain locker location 88 is also depicted in FIG. 6.

FIGS. 7 and 8 assist in depicting the layout of the vessel by showing profile and sectional views. FIG. 7 shows the bulwark 86, soaking tank 77, anchor windlass 87, vessel bulkheads 90, and tug push notch 75. FIG. 8 depicts a section view of the membrane cartridges 78, the crane 76, hatch covers 73, and bulwark 86.

While FIGS. 5 through 8 focus on the design layout of an immersed membrane system, architecturally, pressurized membrane systems could readily be installed and incorporated into such a treatment vessel. A pressurized membrane system typically has its own housing that contains the membranes and into which effluent flow from pretreatment tanks could be pumped and permeate and retentate streams extracted. These housings could readily be installed on the main deck with pretreatment tanks underneath in the hold on the starboard and port sides of the vessel, with pretreatment tanks in the center of the vessel, similar to the immersed membrane system configuration shown in FIGS. 5 through 8. Pressurized, housed systems, which do not require water-filled tanks, provide the advantage of a lower weight system.

Although the aforementioned particular embodiments are shown and described herein, it is understood that various other modifications may be made without departing from the scope of the invention, as noted in the appended claims.

We claim:

1. A system for dredging contaminated aquatic sediments, comprising: an excavator enclosed in a water-retaining housing; said housing comprising a pressure-controllable enclosure (20); said excavator being hingedly attached within said housing; said excavator being capable of pivoting and extending below the bottom of the housing and being capable of pivoting and retracting into the housing between an open and closed position, respectively;
at least one filtration system using at least one filter capable of filtering solids.

2. The dredging system as in claim 1 wherein said filtration system is a microfiltration system.

3. The dredging system as in claim 1 wherein said filtration system is an ultrafiltration system.

4. The dredging system as in claim 1 wherein said filtration system uses filters capable of filtering solids in a microfiltration to ultrafiltration size range.

5. The dredging system as in claim 1 further comprising at least one filtration system of a microfiltration system and an ultrafiltration system for removing particulates from water retained by said housing during removal of sediments.

6. The dredging system as in claim 1 wherein said filtration system is a membrane filtration system.

7. The dredging system as in claim 1 further comprising a post-treatment system for removal of residual soluble contaminants from the effluent stream of water retained by said housing during removal of sediments.

8. The dredging system as in claim 1 wherein said excavator is an openable and closable clamshell-type dredge bucket (10) mounted within said housing enclosure (20).

9. The dredging system of claim 1, wherein said housing comprises a pneumatic pressurizer for alternate positive and negative pressurization of said pressure-controllable enclosure (20).

10. The dredging system of claim 1, wherein said housing includes a hydraulic piston (34) controlling opening and closing movements of said excavator.

11. The dredging system of claim 10, wherein said housing comprises a rotating door (21); said rotating door (21) being attached within said housing (20) with a single hinge, said rotating door (21) comprising a bottom of said housing (20) when said rotating door (21) is in said closed position.

12. The dredging system as in claim 11 wherein said housing communicates with a pump.

13. The dredging system as in claim 12 wherein said housing (20) has at least one submersible water pump (26) attached thereon, said at least one water pump (26) and said at least one water line (25) for evacuating water from said pressure controlled housing enclosure (20).

14. The dredging system as in claim 12 wherein said housing (20) has a surface supplied pump attached thereto, said surface supplied pump for evacuating water from said pressure controlled housing enclosure (20).

15. The dredging system as in claim 12 wherein said housing further comprises at least one pneumatic pressure line (27) for controlling air pressure within said pressure-controllable enclosure (20); said housing comprising at least one hydraulic pressure actuator line (28) for actuating and controlling said rotating door (21) between said open (21) and closed positions (22).

16. The dredging system as in claim 15 wherein said housing includes at least one lifting shackle (30) connected to at least one dredge bucket shaft (31); said dredge bucket shaft (31) being guided into the top of said housing (20) by means of at least one stuffing box (32); said at least one stuffing box (32) for leakage or loss of pressure inside said pressure-controllable enclosure (20); said housing comprising at least two hydraulic door control lines (28) for actuating and controlling said at least two door control pistons (23).

17. The dredging system as in claim 11 wherein said housing (20) has at least one hydraulically actuated door control piston (23) mounted, respectively on at least one piston support column (24).

18. The dredging system of claim 1, wherein said at least one filtration system comprises at least one pretreatment equalization tank area (41) for receiving incoming dredge water (40); said at least one filtration system further comprising at least one filtration area (44); said at least one filtration area (44) having said at least one filter therein.

19. The dredging system as in claim 18 wherein said at least one filtration system includes at least one storage means, respectively, for chemical coagulants and for chemical flocculants, said coagulants and flocculants for enhancing removal of particles that are amenable to such removal treatment; said chemical enhanced particle removal occurring at said at least one pretreatment equalization tank area (41).

20. The dredging system as in claim 1 wherein said at least one filtration system includes at least one storage means, respectively, having chemicals/reagents for stabilizing solids obtained during dredging.

21. The dredging system of claim 1, wherein said at least one filtration system comprises a positively pressurized membrane filtration means.

22. The dredging system of claim 1, wherein said at least one filtration means comprises a negative pressurized membrane filtration means.

23. The dredging system of claim 1, further comprising a self-contained floating water treatment vessel.

24. A system for dredging contaminated aquatic sediments, comprising:
an excavator enclosed in a water-retaining housing; said housing comprising a pressure-controllable enclosure (20); said excavator being hingedly attached within said housing; said excavator being movable about said hinged attachment between an open and a closed position; said excavator having actuator means for causing said excavator to move between its alternate open and closed positions.

25. The dredging system as in claim 24 wherein said excavator is an openable and closeable clamshell-type dredge bucket (10) mounted within said housing enclosure (20).

26. The dredging system of claim 24, wherein said housing comprises pneumatic pressurization means for alternate positive and negative pressurization of said pressure-controllable enclosure (20).

27. The dredging system of claim 24, wherein said housing includes at least one hydraulic piston controlling opening and closing movements of said excavator.

28. The dredging system of claim 27, wherein said housing comprises a rotating door (21); said rotating door (21) being attached within said housing (20) with single hinge means, said rotating door (21) comprising a bottom of said housing (20) when said rotating door (21) is in said closed position (22).

29. The dredging system as in claim 28 wherein said housing communicates with a pump.

30. The dredging system as in claim 29 wherein said housing (21) has at least one submersible water pump (26) attached thereon; said at least one water pump (26) and said at least one water line (25) for evacuating water from said pressure controlled housing enclosure (20).

31. The dredging system as in claim 29 wherein said housing (21) has a surface supplied pump attached thereto, said surface supplied pump for evacuating water from said pressure controlled housing enclosure (20).

32. The dredging system as in claim 29 wherein said housing further comprises at least one pneumatic pressure line (27) for controlling air pressure within said pressure-controllable enclosure (20); said housing comprising at least two hydraulic pressure actuator lines (28) for actuating and controlling said rotating door (21) between said open (21) and closed (22) positions.

33. The dredging system as in claim 32 wherein said housing includes at least one lifting shackle (30) connected to at least one dredge bucket shaft (31); said dredge bucket shaft (31) being guided to the top of said housing (20) by means of at least one stuffing box (32); said at least one stuffing box (32) for leakage or loss of pressure inside said pressure-controllable enclosure (20); said housing comprising at least two hydraulic door control lines (28) for actuating and controlling said at least two door control pistons (23).

34. The dredging system as in claim 28 wherein said housing (21) has at least one hydraulically actuated door control piston (23) mounted, respectively on at least one piston support column (24).

35. The dredging system as in claim 34 wherein said at least one piston is a pair of pistons and said at least one piston support columns is a pair of piston support columns.

36. The dredging system of claim 24, further comprising a self-contained floating water treatment vessel.

* * * * *